V. E. DAVID.
WATER HEATING SYSTEM.
APPLICATION FILED APR. 1, 1918.
1,298,301.
Patented Mar. 25, 1919.
2 SHEETS—SHEET 1.
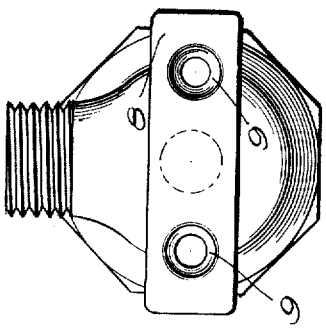
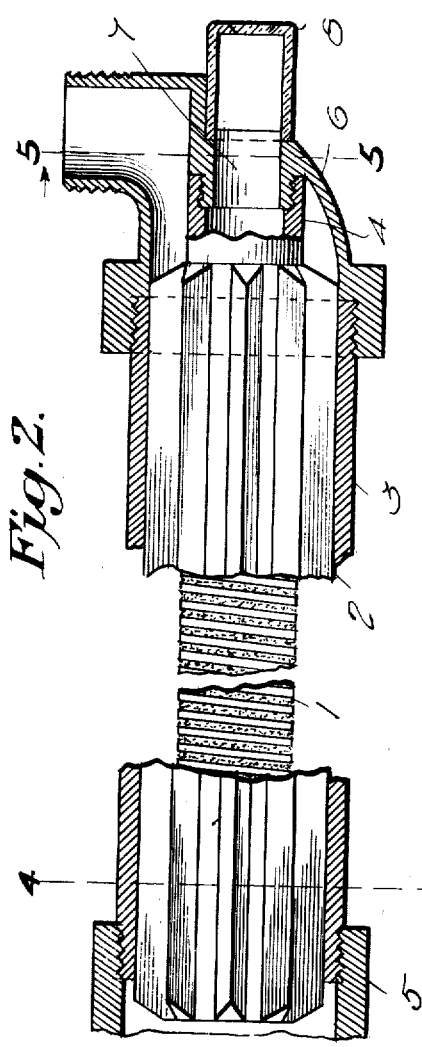
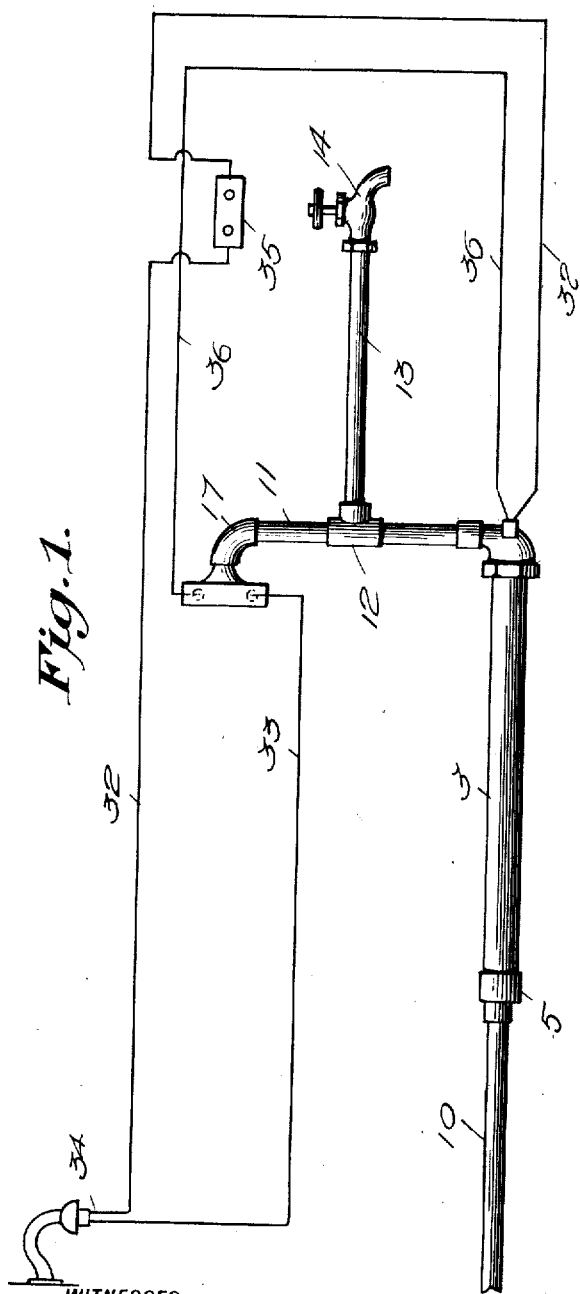
Virgil E. David, INVENTOR
BY
ATTORNEYS
WITNESSES

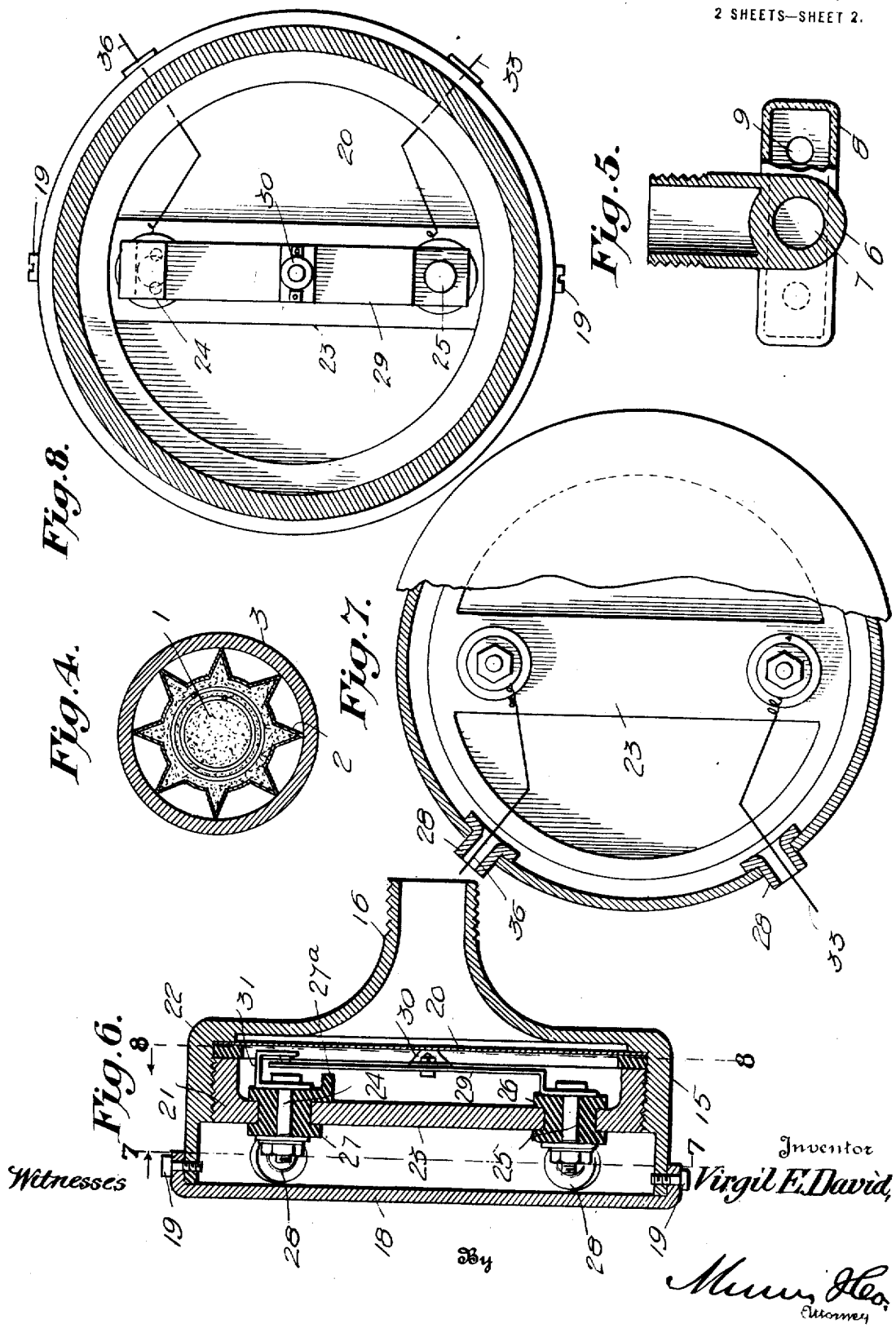

UNITED STATES PATENT OFFICE.

VIRGIL ELMO DAVID, OF OMAHA, NEBRASKA.

WATER-HEATING SYSTEM.

1,298,301.   Specification of Letters Patent.   Patented Mar. 25, 1919.

Application filed April 1, 1918. Serial No. 226,013.

*To all whom it may concern:*

Be it known that I, VIRGIL E. DAVID, a citizen of the United States, and a resident of Omaha, in the county of Douglas and State of Nebraska, have invented certain new and useful Improvements in Water-Heating Systems, of which the following is a specification.

My invention is an improvement in water heating systems of the instantaneous type, and has for its object to provide electrically controlled heating means for heating the water, interposed in the length of the water pipe, and wherein other means is provided for controlling the supply of current to the heater operated by the flow of the water to the heater.

In the drawings:

Figure 1 is a diagrammatic view showing the arrangement of the pipes, the controlling mechanism and the wiring;

Fig. 2 is a sectional view of the heating unit, with parts broken away;

Fig. 3 is an end view;

Figs. 4 and 5 are sections on the lines 4—4 and 5—5 of Fig. 2, the latter view looking in the direction of the arrows adjacent the line;

Fig. 6 is a vertical section through the controlling unit;

Figs. 7 and 8 are sections on the lines 7—7 and 8—8 of Fig. 6, both views looking in the direction of the arrows adjacent the respective lines.

In the present embodiment of the invention, a heating unit is provided, consisting of a core 1 of cylindrical form and of suitable material, as, for instance, fire clay, and about this is wound the heating element, that is, the wire, in a spiral form. The core with the heating element is placed in a jacket 2 of sheet copper, and the said jacket, as shown more particularly in Fig. 4, has a series, eight in the present instance, of V-shaped projections extending longitudinally thereof and spaced apart from each other at equal distances.

The core with the heating element is embedded in the jacket within pulverized fire clay, and the jacket is held within a casing 3 in the form of a section of pipe, the jacket being of such size that it will fit within the pipe, preferably a pipe of one and one-half inches diameter. One end of the jacket is closed, and at the other end the jacket is welded on to a conduit section 4 which is internally threaded at the end remote from the heating unit.

A reducing union 5 is threaded on to one end of the pipe 3, and an elbow 6 is threaded on to the other end. This elbow has an externally threaded nipple 7 which engages within the threaded end of the conduit section 4 and the nipple communicates with an insulating extension casing 8 of porcelain or the like. This extension casing 8 has two openings 9 for the two lead wires of the circuit of the heating unit.

The reducing union 5 of the pipe or casing 3 is connected with a suitable water supply pipe 10, and the end of the elbow 6 remote from the heating unit is connected with a vertical section of pipe 11. It will be noticed from an inspection of Fig. 2 that the elbow 6 is a reducing elbow, the pipe 11 being of the same diameter as the pipe 10. A T 12 is interposed in the length of the pipe 11 and a discharge pipe 13 leads from the T, and the pipe 13 having the usual valve or faucet 14.

The controlling unit for the heater comprises a substantially cylindrical box or casing 15 having a reduced funnel shaped axial extension 16 which is adapted to be connected to the upper end of the pipe 11 by means of an elbow 17, the open end of the casing 15 being closed by a cap 18, and the said cap is secured to the casing by means of screws 19.

A flexible diaphragm 20 is arranged transversely of the casing 15 near the extension 16, and a ring 21 is threaded into the casing, the said ring being adapted to engage a gasket 22 arranged between the ring and the diaphragm, to make a water tight joint at this point. This ring as shown in Fig. 6 has a diametrically extending bar 23 connecting the opposite sides of the ring, and this bar supports binding posts 24 and 25, the said posts being insulated from the bar by insulating washers 26 and 27. The casing has radial insulating bushings 28 of porcelain or the like through which the lead wires extend to the binding posts, as shown in Fig. 7, and these binding posts have hexagonal nuts and washers for connecting the wires to the posts. A resilient arm 29 of conducting material is secured to the binding post 25 at one end, the other end being free and extending toward the binding post 24 and near the diaphragm, and a stud 30 is secured to the resilient contact arm at its center, in insulated relation, the said stud being adapted to engage the diaphragm to cause the diaphragm to operate the resilient arm, which is a switch arm.

A contact arm 31 of resilient material is secured to the binding post 24, and this arm, which is substantially U-shaped, having one arm secured to the binding post and the other extending on the opposite side of the free end of the switch arm 29 from the binding post, is arranged to be engaged by the free end of the said arm when the diaphragm is in normal position. The switch arm and the contact member have platinum contact points, and it will be evident that whenever pressure is brought upon the diaphragm on the opposite side from the switch, the switch arm 29 will be moved out of contact with the contact arm 31, thus breaking the circuit through the heating element.

This circuit comprises lead wires 32 and 33 which lead from a suitable source of electrical energy, as, for instance, a battery 34, and a lead wire 33 is connected to the binding post 25. A switch 35 is interposed in the length of the lead wire 32, and the end of the said wire remote from the source of electrical energy is connected to one of the terminals of the heating element. A lead wire 36 is arranged between the other terminal of the heating union and the binding post 24, and it will be evident that when the parts of the controlling unit stand in the position of Fig. 6 the current will flow from battery through the lead wire 32 through the heating element, returning by way of the lead wire 36, the switch arm 29 and the lead wire 33 to battery. The switch 35 is an ordinary cut out switch of the push button type, having one button for closing the circuit and one for opening the circuit.

In operation, when the valve 14 is opened to permit water to flow, pressure upon the diaphragm 20 due to the head of water in the water pipe is relaxed, and the parts of the controlling unit take the position of Fig. 6, that is, the switch is closed, and the water flowing through the casing 3 is heated by the current flowing through the heating unit. This water is divided into eight layers as it passes between the wings or vanes of the jacket 2, and will be heated during its passage. When the valve 14 is closed, the head of water within the system forces the diaphragm 20 to the left of Fig. 6, that is, toward the switch arm 29 and, through the engagement of the diaphragm with the stud 30, the free end of the switch arm will be moved out of contact with the free end of the contact arm 31, thus breaking the circuit through the heating element.

It will be understood that before opening the valve 14 the switch 35 will be operated to close the circuit, and when sufficient water has been drawn it is preferable that the switch be operated to open the circuit, although it is obvious that the controlling unit will attend to this matter automatically.

Referring to Fig. 6 of the drawing, it will be noticed that the bushing 27 has an extension 27$^a$ at its lower side, which provides an abutment for preventing the spring arm 29 from moving too far back from the diaphragm.

I claim:

1. A water heating system, comprising an electrically controlled heater interposed in the system over which the water flows, said system having a valved discharge and having beyond the discharge a casing with which the system communicates, a diaphragm extending transversely of the casing, an electric switch controlled by the lateral movement of the diaphragm, and an electrical circuit having a source of energy for the heater and in which the switch is interposed for opening and closing the same, said switch being arranged to open the circuit when the diaphragm is moved laterally by the pressure of the water in the system and to close the circuit when the pressure is relaxed by the opening of the valve.

2. A water heating system comprising an electrically controlled heater interposed in the system past which the water flows, said system having a valved discharge and having a casing with which the system communicates, a diaphragm extending transversely of the casing, an electrical circuit having a source of energy for the heater, a switch in the casing interposed in the circuit for controlling the same, said switch being normally closed and being arranged adjacent to the diaphragm to be opened thereby when the diaphragm is moved laterally by the water pressure.

VIRGIL ELMO DAVID.

Witnesses:
L. S. LAMBERT,
CECIL GAMLEN.